Nov. 3, 1936.   L. W. WRIGHT   2,059,505
AUTOMATIC PATTERN CONTROLLED REPRODUCING MACHINE
Filed May 31, 1934   5 Sheets-Sheet 4

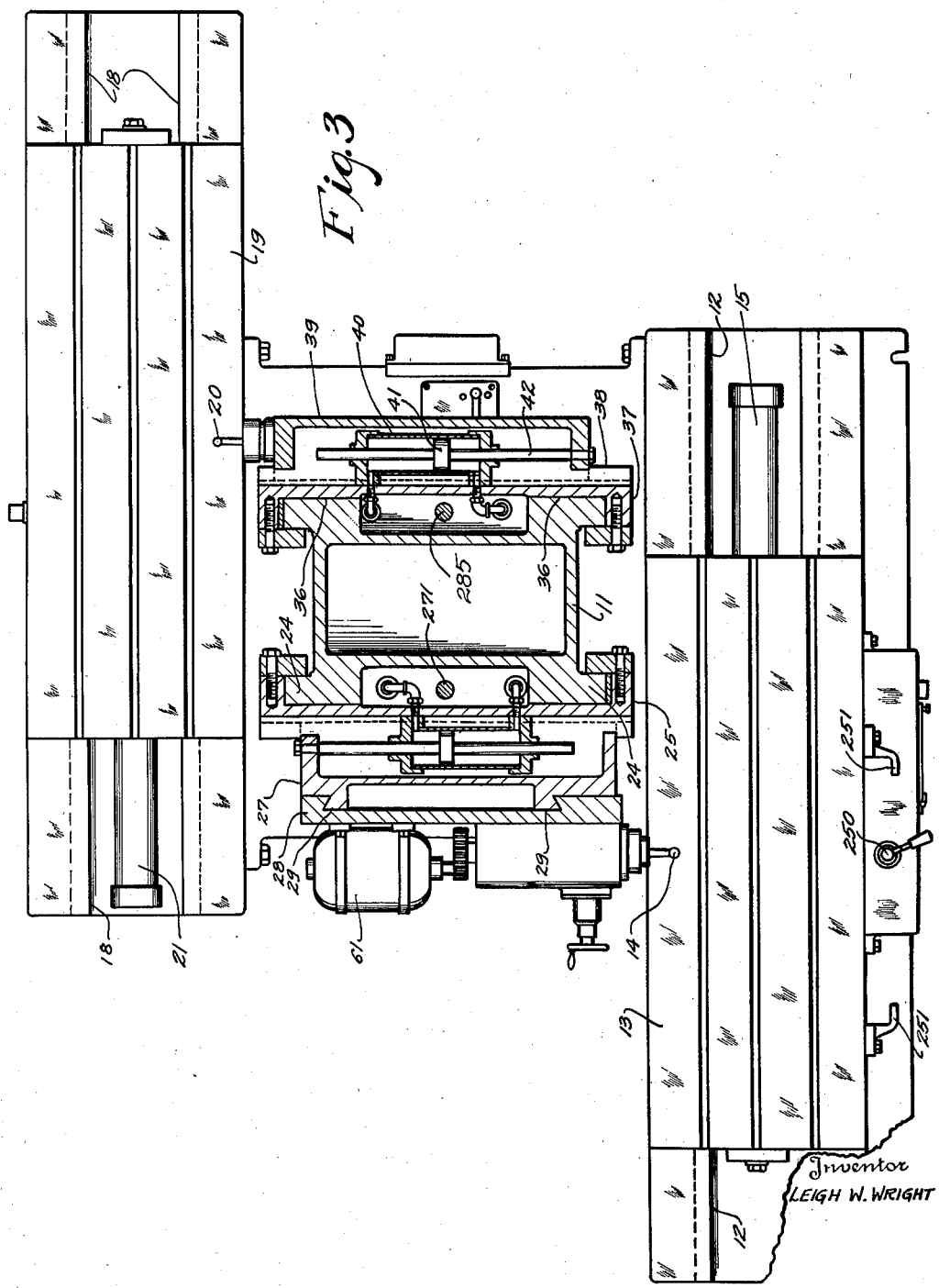

Inventor
LEIGH W. WRIGHT
By OHK Parsons
Attorney

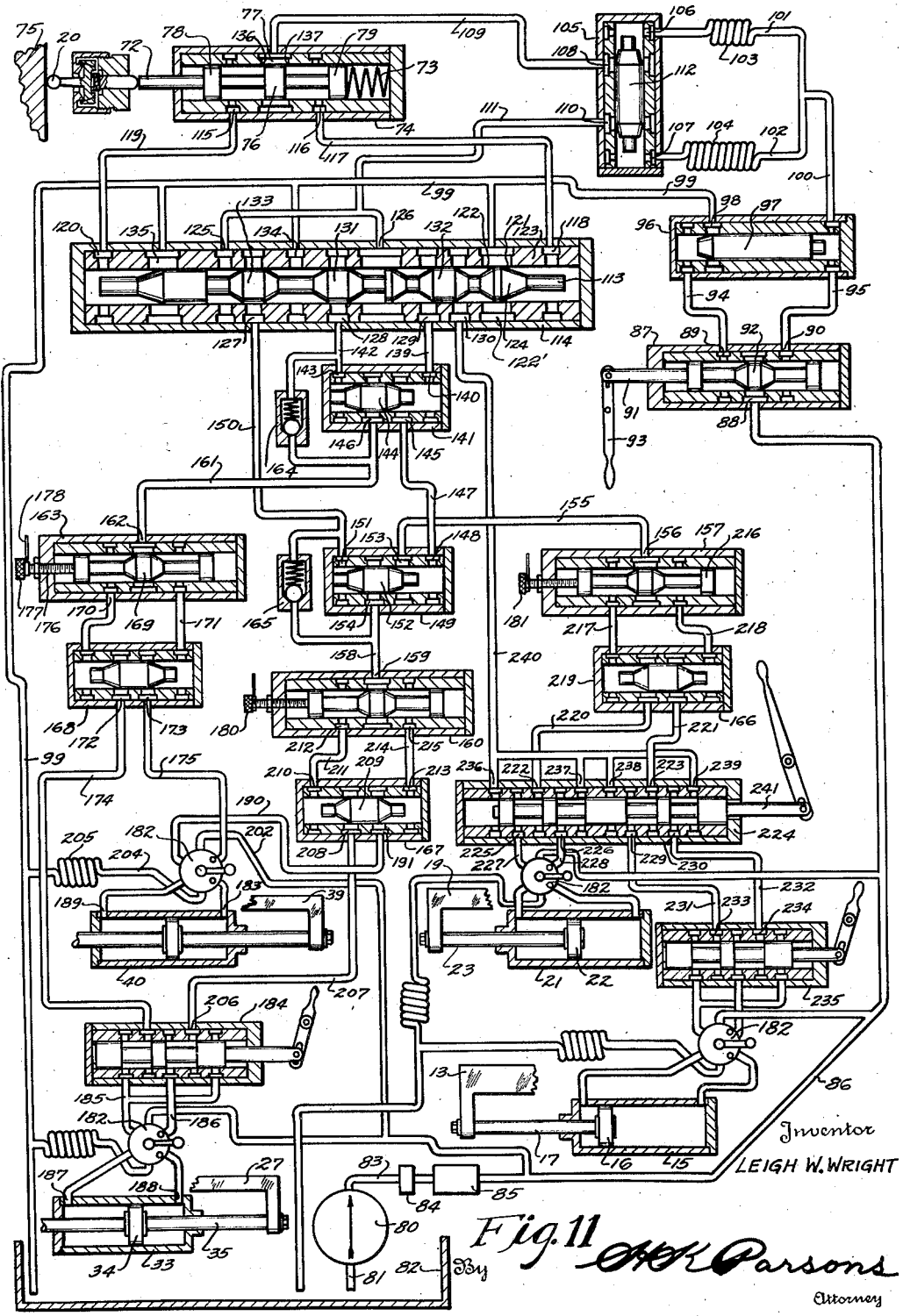

Patented Nov. 3, 1936

2,059,505

UNITED STATES PATENT OFFICE 2,059,505

AUTOMATIC PATTERN CONTROLLED REPRODUCING MACHINE

Leigh W. Wright, Norwood, Ohio, assignor to The Cincinnati Milling Machine Company, Cincinnati, Ohio, a corporation of Ohio Application May 31, 1934, Serial No. 728,312

50 Claims. (Cl. 90—13.5)

This invention relates to improvements in automatic pattern controlled machine tools.

It is well known in this art that a pattern may be so copied as to produce a duplicate thereof which may be defined as a copy of equal size and proportion to the original, or it may be so copied as to produce a reproduction thereof which may be defined as one of unequal size to the original but of a definite scale or proportion thereto and resulting in one which may be larger or smaller than the original.

It has been customary to produce duplicates on automatic pattern controlled machines and to produce reproductions on machines utilizing the pantograph principle which makes these machines adjustable to obtain different proportions, and these latter machines are usually manually controlled rather than automatically controlled. This means that the tracing or scanning of the pattern must be manually performed.

The duplicating machines of the pantograph type have other disadvantages in that the cutter must be supported on the pantograph bars which limits the size of the cutter, the amount of power that may be applied thereto, and also the steadiness or rigidity of the cutter so desirable for smooth work.

One of the objects of this invention is to produce a machine for reproducing patterns selectively at an enlarged or reduced scale which eliminates the pantograph principle entirely so that the cutter may be solidly supported upon a main frame of the machine, thus eliminating prior disadvantages and making possible a powerful, steady machine.

Another object of this invention is to produce an automatic machine of the pattern controlled type in which a given deflection of the tracer will produce unequal or proportional amounts of relative movement between the pattern and tracer and between the cutter and work.

A further object of this invention is to produce an hydraulic control circuit which may be substituted for the pantograph construction in machines of the character under consideration and which may be adjusted to proportion the rate of relative movement between the pattern and tracer relative to the rate of movement between the cutter and work so that the pattern may be reproduced at either an enlarged or a reduced scale.

An additional object of this invention is to provide a simple, automatic, hydraulically operated pattern controlled machine tool for duplicating or reproducing patterns which is simple to construct, adjust and operate.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 3 is a plan view of the machine shown in Figure 2.

Figure 4 is a section on the line 4—4 of Figure 1.

Figure 5 is a plan view of the control clutch as viewed on the line 5—5 of Figure 4.

Figure 11 is a diagrammatic view of the hydraulic control circuit.

Figure 1:
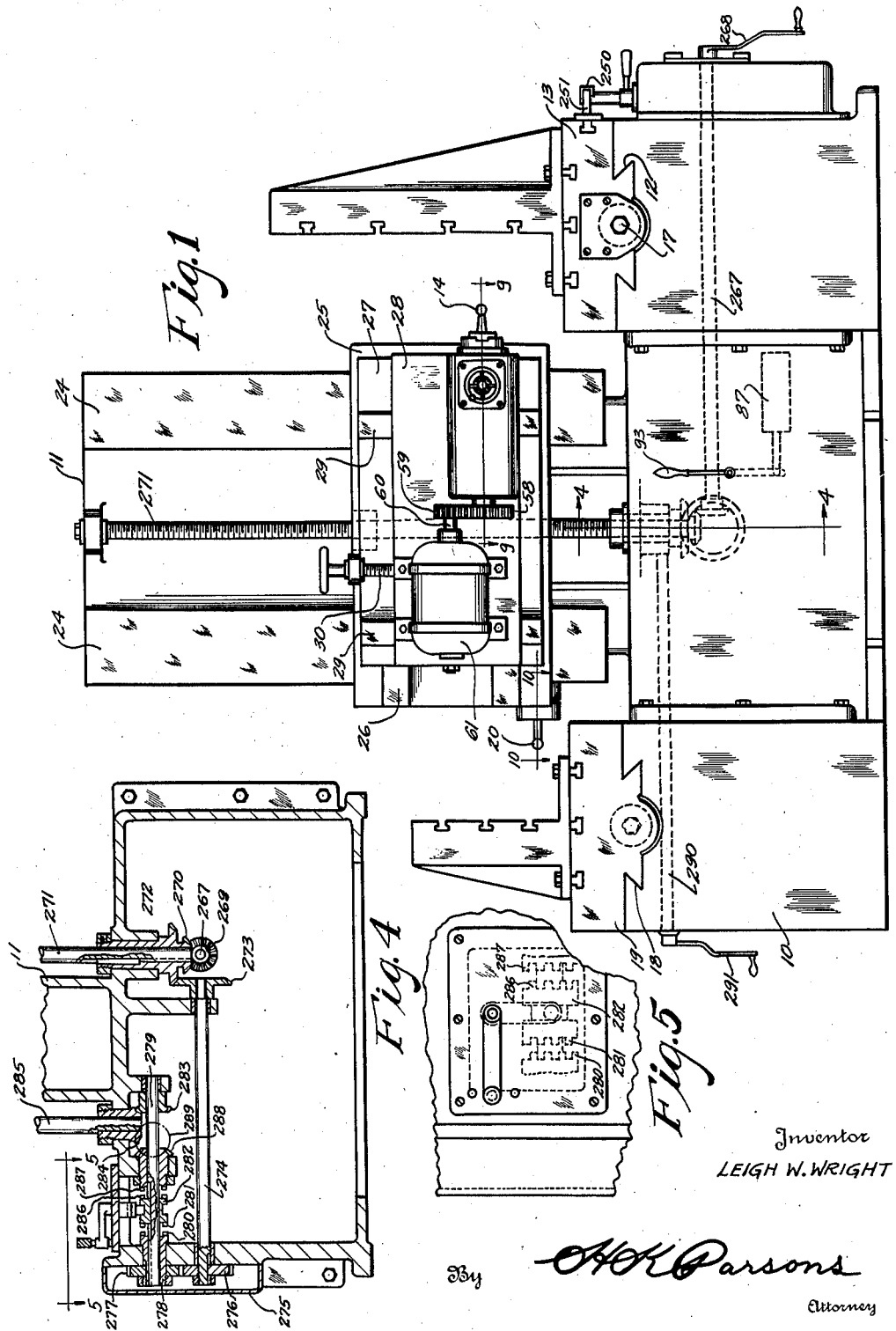
Figure 1 is an elevation of a machine embodying the principles of this invention.
Figure 2:
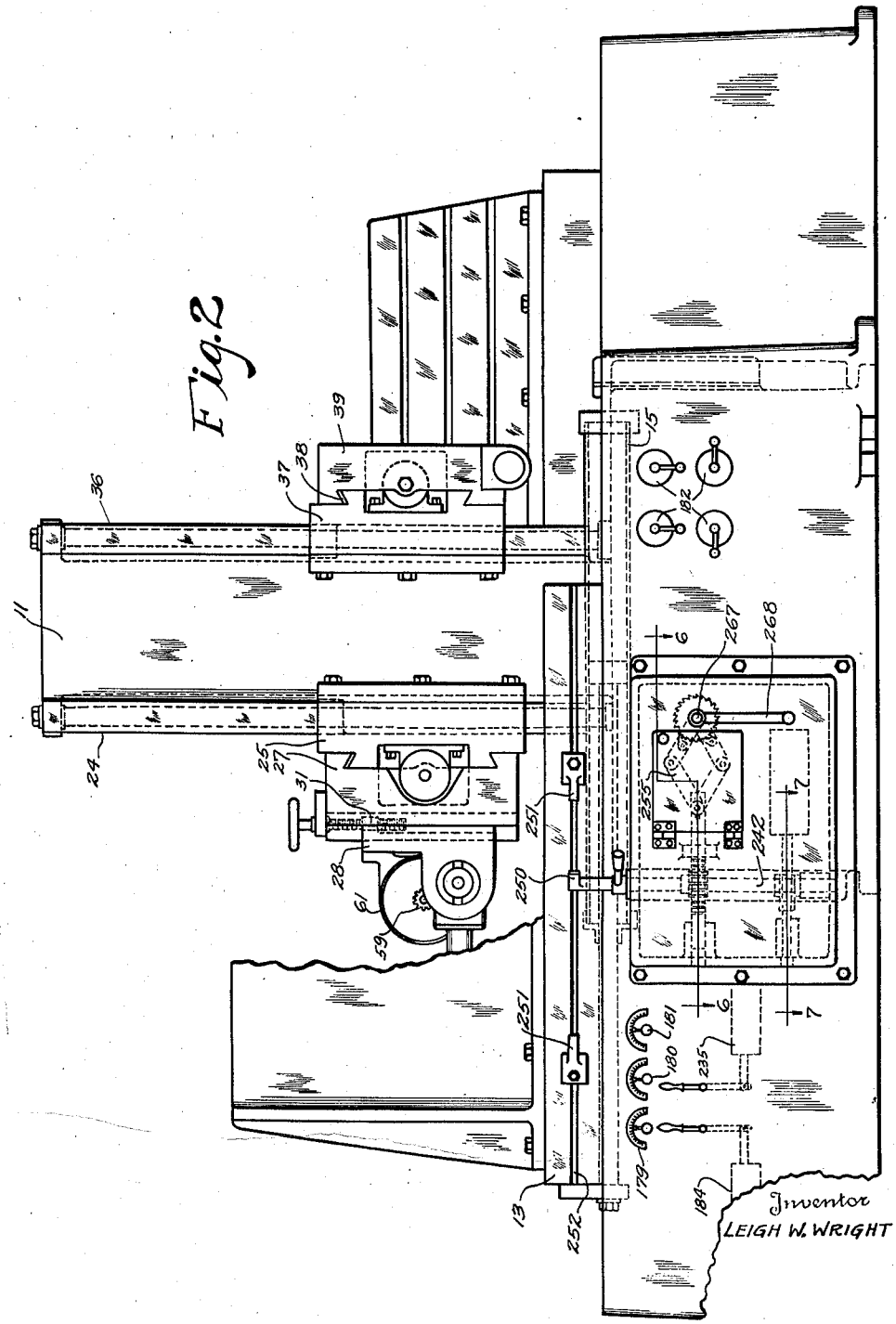
Figure 2 is an elevational view of the machine as viewed from the right of Figure 1.

In Figures 1, 2 and 3 of the drawings the reference numeral 10 indicates generally the bed of the machine, in the center of which uprises a column portion 11. The bed 10 has a first set of guideways 12 formed thereon for supporting and guiding a work table 13 for relative movement with respect to a cutter 14. The work table is adapted to be power moved by means of an hydraulic motor comprising a cylinder 15 having a contained piston 16 which is operatively connected by the piston rod 17 to the table.

The bed is provided with a second set of guideways 18 formed parallel to the table guideways 12 for supporting and guiding a pattern support 19 for relative movement with respect to a tracer 20. The pattern support is also moved by an hydraulic motor comprising a cylinder 21 having a contained piston 22 which is operatively connected by a piston rod 23 to the pattern support.

The central column 11 has a first pair of vertical guides 24 formed upon one face thereof for receiving and guiding a vertically movable slide 25. This slide in turn has horizontal guides 26 formed thereon for receiving and guiding an auxiliary slide 27 which in turn supports the spindle carrier 28. The spindle carrier is guided by the ways 29 for manual adjustment by means of the screw 30 which is fixed against axial movement in the slide 27 and is threaded in a nut 31 formed integral with the spindle carrier. Rotation of the screw is effected by the hand wheel 32 carried by one end of the screw. This manual adjustment is utilized only in setting up the machine and permits minor adjustments of the cutter with respect to the work to be made, so as to accurately position the cutter relative to the tracer. The slide 27 is hydraulically operated by means of the motor comprising a cylinder 33 having a contained piston 34 which is operatively connected by the piston rod 35 to the slide. It will be noted from Figures 3 and 11 that the piston rod 35 extends through both ends of the cylinder 33 which is necessary for automatic control because the flow to and from this cylinder should preferably be in equal amounts.

The column has a second set of vertical guideways 36 formed thereon for receiving and guiding the vertically movable slide 37 which in turn has horizontal guides 38 formed thereon for receiving and guiding the tracer support 39. The tracer support is also operated by an hydraulic motor comprising a cylinder 40 having a contained piston 41 which is operatively connected to the slide by the piston rod 42. This piston rod extends through both ends of the cylinder for the same reasons as explained in connection with the piston rod 35. It will be noted that the guideways on opposite sides of the column lie in planes which are perpendicular to the planes of the guideways 12 and 18. It will also be noted that separate slides have been provided for supporting the work, the cutter, the tracer, and the pattern respectively. This is necessary in order that the relative movement as between the cutter and work may be at an entirely different rate than the rate of relative movement between the tracer and pattern which is necessary if enlargements or reductions are to be effected.

Figure 9:
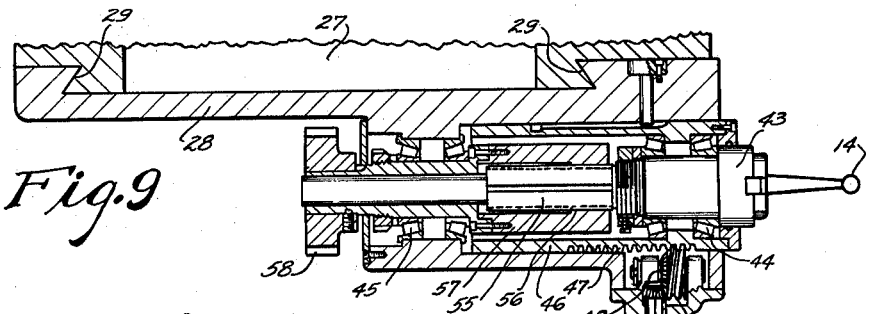
Figure 9 is a section on the line 9—9 of Figure 1 showing the quill adjusting mechanism.

The cutter 14, as more particularly shown in Figure 9, is supported in a spindle 43 which is rotatably mounted at opposite ends in anti-friction bearings 44 and 45 respectively. The anti-friction bearings 44 are fixed in the quill 46 for movement therewith. The quill 46 has spiral rack teeth 47 cut in one face thereof for inter-engagement with spiral worm 48 which has integral therewith a bevel gear 49 inter-meshing with the bevel pinion 50. The last named pinion is secured to the end of shaft 51 which is rotatable by the hand wheel 52. The hand wheel is connected and disconnected to the shaft by means of clutch teeth 53 in the usual manner of such constructions. Also, a micrometer dial 54 may be associated with the shaft 51 to indicate the amount of adjustment effected.

The spindle 43 has a splined portion 55 which interengages a complementally-shaped portion 56 formed in the end of the sleeve 57. This sleeve has integrally secured thereto a gear 58 which inter-meshes with a gear 59 secured to the end of the motor shaft 60. The motor 61 which rotates shaft 60 is integrally secured to the slide 28 for movement therewith. It will thus be seen that the prime mover for the cutter spindle is carried directly on the spindle carrier for movement therewith.

Figure 10:
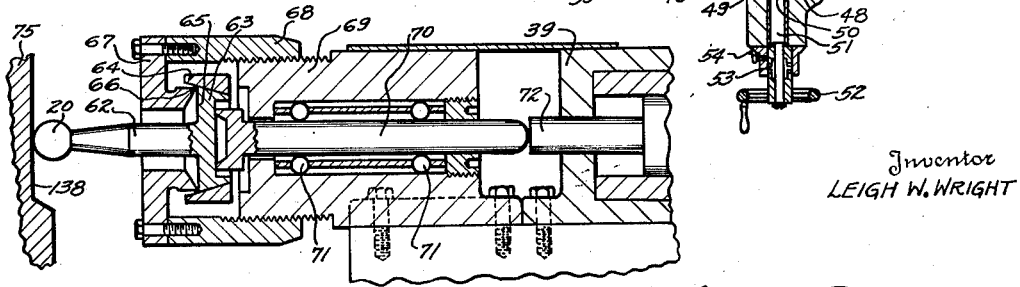
Figure 10 is a section through the tracer head as viewed on the line 10—10 of Figure 1.

The construction and manner of supporting the tracer in the slide 39 is more particularly shown in Figure 10. The tracer 20 is in the form of a small ball secured to the end of a shank 62 projecting from the center of an enlarged head 63 which has a peripheral flange 64 projecting from the same face from which the shank 62 projects. This flange forms an obtuse angle with the face 65 of the head 63 and into the corner of which fits the annular knife edge 66. The knife edge is carried or formed on the member 67 which in turn is secured to the sleeve 68 threaded on the end of the support 69. It will now be seen that the tracer shank 62 may be laterally moved in any direction whereby the tracer button 20 is supported for universal movement in a lateral direction, and also may be moved axially in a horizontal plane.

The head 63 is maintained in contact with the knife edge 66 by the plunger 70 which is mounted on anti-friction members 71 and which projects beyond the support 69 into engagement with the end of the valve stem 72. The valve stem in turn, as shown in Figure 11, is acted upon continuously by a spring 73 contained in the valve housing 74. The spring 73 thus acts to normally maintain contact between the head 63 and the knife edge 66 which in turn supports the shank 62 in a horizontal plane when the tracer button 20 is out of contact with the pattern, represented by the reference numeral 75.

The valve 74 serves to control the automatic operation of the machine and to this end the valve stem 72 is provided with a central spool 76 which is movable with respect to the pressure port 77 and additional spools 78 and 79 on opposite sides of the central spool. The pressure port 77 is supplied with fluid from a pump 80 suitably located within the bed of the machine, for actuation by a prime mover such as an electric motor, not shown. The pump 80 which may be either a constant displacement type or a variable displacement type, has an intake port 81 through which it withdraws fluid from the tank or reservoir 82 suitably located in the bottom of the machine bed. This pump has a delivery port 83 which is connected in series with suitable filtering devices 84 and 85 which insure that all foreign particles are removed from the oil so as to insure accurate operation of the various valve mechanisms and of the machine as a whole. From the filtering devices the fluid flows through a main channel 86 to a rate control valve 87 having an intake port 88 and delivery ports 89 and 90. The plunger 91 of this valve has an intermediate spool 92 which is tapered at opposite ends, the spool being adjustable relative to the port 88 to divide the incoming flow in various proportions between the ports 89 and 90, the portion flowing through the port 89 being returned to reservoir and the other portion being utilized for operation of the machine. It will thus be seen that as the portion going to port 89 is increased, that the rate of operation of the machine will be decreased. The valve plunger 91 may be manually adjusted by suitable means such as the pivoted control lever 93.

Ports 89 and 90 are connected by channels 94 and 95 respectively to opposite ends of a balancing valve 96. This valve has a plunger 97 which is automatically positionable by the pressures acting upon opposite ends thereof to maintain the division of flow established by the valve 87. The incoming fluid to this valve through channel 94 escapes through port 98 and channel 99 through which it is returned to the reservoir 82. The fluid coming to this valve through channel 95 continues to channel 100 and is again divided between two branches 101 and 102 which have fluid resistances 103 and 104 respectively therein. These fluid resistances may be proportioned to determine the amount of fluid which is utilized by the pilot control circuit which includes the tracer control valve 74 and the main circuit which effects operation of the slides. A balancing valve 105 has a first port 106 which is connected to the output end of the fluid resistance 103 and a second port 107 connected to the output end of the fluid resistance 104. This valve also has a port 108 to which is connected the channel 109 of the pilot control circuit and a port 110 to which is connected the channel 111 of the main control circuit. The balance valve has a reciprocable plunger 112 which is automatically positioned by the pressures acting upon opposite ends thereof to maintain the proportionate flows established by the resistances 103 and 104.

The channel 109 is connected to the port 77 of the tracer control valve which in turn controls through a pilot circuit the position of the plunger 113 of the secondary valve 114 which determines the distribution of flow from channel 111 among the various slide motors. The sleeve 68, Figure 10, is rotatably adjusted to position the spool 76 of the tracer controlled valve in such a position that when the tracer is out of contact with the pattern, the spool will cut off all flow to port 115 and permit all the flow to go to port 116. The port 116 is connected by channel 117 to the right hand port 118 of the secondary valve 114 and port 115 is connected by channel 119 to the left hand port 120 of the secondary valve. Since all the flow is going into the right hand end of the secondary valve, there will be no pressure on the left end of plunger 113 and it will shift all the way in that direction to the limit of its movement. The fluid entering the valve 114 through port 118 discharges through the fluid resistance 121 into the return channel 99. The fluid resistance 121 consists of diametrically opposed narrow slots 122 formed in the bottom of an annular groove 122' in the sleeve 123, and a tapered spool 124 formed in the plunger 113 and movable relative to the slot to throttle the flow and thereby change the value of the resistance.

The secondary valve has two pressure ports 125 and 126 connected to channel 111 and four additional ports 127, 128, 129 and 130. The valve plunger 113 has a spool 131 movable relative to port 128 to determine the amount of flow thereto from the pressure port 126 to effect the advancing movement of the tracer and cutter toward the pattern and work respectively. The valve plunger has another spool 132 which controls the connection between pressure port 126 and port 129 to determine the feeding movement of the pattern support and work support. Another spool, 133 determines the connection between pressure port 125 and port 127 and thereby the retractive movement of the cutter and tracer relative to the work and pattern respectively. Since when fluid is being delivered to either port 128 or port 127 the remaining port must be connected to exhaust in order to permit the movement to take place, the spools 131 and 133 are so arranged relative to an exhaust port 134 that when port 128 is connected to pressure port 126, port 127 is connected to the exhaust port 134. Similarly, when port 127 is connected to the pressure port 125 the port 128 is connected to the return port 134. When the valve plunger 113 is shifted all the way to the left due to the tracer being out of contact with the pattern, the spool 132 closes port 129 and connects port 130 to the exhaust line 99. This will prevent any feeding movement of the slides. Also, the spool 133 will be in a position to connect port 127 to return port 134 and the spool 131 will be in a position to connect the pressure port 126 to port 128 which will thereby cause the cutter and tracer to advance respectively toward the work and pattern. It will thus be seen that when the rate control plunger 91 is moved to a position to connect port 88 with port 90 to start operation of the machine that the first thing that happens is that the tracer and cutter will be automatically moved into engagement with the pattern and work. As the tracer engages the pattern, the plunger 72 will be moved toward the right as viewed in Figure 11, thereby gradually reducing the flow to port 116 and admitting flow to port 115 thereby increasing the pressure on the left end of plunger 113 of the secondary valve and shifting the same toward a central position. As the plunger moves toward the right, it will increase the value of the fluid resistance 121 and decrease the value of the fluid resistance 135 which is similar in construction to the fluid resistance 121, the fluid passing through this resistance escaping to the return line 99. When the spool 76 has reached a central position with respect to the port 77, the spaces 136 and 137 between the opposite edges of the spool and the edge of the port which in effect constitute fluid resistances are equal, thereby causing an equal drop in pressure to lines 117 and 119 and this will cause the plunger 113 to shift to such a position that the fluid resistances 121 and 135 are equal because the pressures on opposite ends of the plunger 113 will only be equalized when these resistances are equal in value respectively to the pair of resistances adjacent port 77. These resistances are so positioned that the plunger 113 will be in a longitudinally central position. It will now be seen that when the machine is started the tracer and cutter move toward the pattern and work and upon contact of the tracer with the pattern the tracer control valve is shifted to reposition the secondary valve. This repositioning of the secondary valve produces the following results. The spool 132 will be moved to uncover port 129 and cause pressure flow thereto from port 126 and thus initiate the feeding movement of the work and pattern slides. At the same time it will partially close port 130 to produce a suitable back pressure in the work and pattern slide cylinders. The spool 131 will move to close port 128 and spool 133 will move to close port 127 so that the tracer and cutter slides will be held stationary. If the surface 138 of the pattern 75, Figure 10, is straight, no further adjustment of the tracer and cutter slides are necessary and the feeding movement will proceed at a maximum rate.

The various spools on the plunger 113 are more or less in effect flow dividing valves, and it is therefore necessary that means be provided for maintaining the divisions created thereby, and to this end the feed port 129 is connected by channel 139 to port 140 of the balancing valve 141. This valve serves to balance the flow between the feed cylinders and the channel 142 through which the fluid flows to effect advancing movement of the cutter and tracer slides. The channel 142 connects port 128 to port 143 of the balance valve. This valve has a plunger 144 which controls the flow of fluid from ports 140 and 143 to ports 145 and 146 respectively. When the valve 113 is in a central position, no flow passes through channel 142 and therefore the pressure in the left end of plunger 144 is nil and the plunger is therefore shifted to the position shown in Figure 11. When flow does occur in channel 142, the plunger 144 shifts to more or less of a central position to balance the flow to ports 145 and 146. The feed line 147 from port 145 is connected to port 148 of a second balance valve 149 which balances the flow between the feed line and channel 150 through which pressure flows to cause return movement of the cutter and work slides. Channel 150 is connected to port 151 of balance valve 149. This valve has a plunger 152 which is shifted to the position shown in Figure 11 when no flow occurs in channel 150, but upon establishment of flow therein will shift to more or less of a central position to control the outgoing flow through ports 153 and 154 of the valve. It will now be seen that the feed line is so connected as to be balanced against either the line causing advancing movement of the tracer and cutter, or against the line causing return movement thereof. The port 153 is connected by channel 155 to port 156 of the first ratio control valve 157. The port 154 of balance valve 149 is connected by channel 158 to port 159 of the second ratio control valve 160. The port 146 of balance valve 141 is connected by channel 161 to port 162 of a third ratio control valve 163. The line 161 is connected through a by-pass valve 164 around the balance valve 141 so that when channel 161 is acting as a return line and the plunger 144 is shifted to the left, the fluid can still escape to reservoir. Similarly, channel 158 has connected thereto a by-pass valve 165 which serves to permit fluid to return to reservoir when channel 158 is acting as a return line.

The three ratio control valves 157, 160 and 163 are flow dividing valves and have associated therewith balancing valves 166, 167, and 168 respectively, so that any division of flow set up by the ratio control valve will be accurately maintained by the balancing valve. Since these valves are the same in construction, it is only necessary to explain one of them. The ratio control valve 163 has a central plunger 169 which divides the incoming flow from port 162 among channels 170 and 171 which are in turn connected to ports at opposite ends of the balance valve 168, the balance valve having a second pair of ports 172 and 173 which are connected respectively by channels 174 and 175 to the cutter slide cylinder 33 and the tracer slide cylinder 40. These ratio control valves act on the same principle as the rate control valve 87 and further explanation of the principle of operation is not believed to be necessary.

The ratio control valves are each provided with a screw threaded adjustment rod 176 which extends to the exterior of the machine and provided with an operating knob 177. Integral with the knob is a pointer 178 which is movable relative to a scale 179 fixed to the side of the machine, as shown in Figure 2, whereby the ratio adjustment of the valve may be ascertained. The ratio control valves 160 and 157 are provided with adjusting knobs 180 and 181 respectively which also have dials and scales associated therewith to determine their position. The screws 176 are threaded in the end of the valve housing and are integrally connected at the end to the valve plunger. These screws may be interconnected through gearing for simultaneous adjustment, although it is preferable to have individual adjustment as shown.

The line 175 of balance valve 168 is connected through a by-pass valve 182 to port 183 of the tracer slide cylinder 40. The line 174 is connected through the reversing valve 184 to either channel 185 or channel 186 which are respectively connected by the by-pass control valve 182 to ports 187 and 188 located at opposite ends of the cutter slide cylinder 33. The other port 189 of cylinder 40 is connected through valve 182 and channel 190 to port 191 of the balance valve 167.

Figure 8:
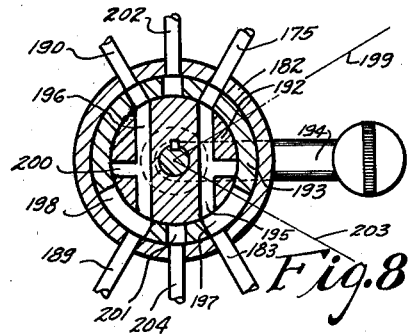
Figure 8 is a detailed section through one of the by-pass control valves.

The details of the by-pass valve 182 are shown more particularly in Figure 8. The valve 182 has a plunger 192 rotatable in a fixed sleeve 193 by a handle 194 which has a central position such as that shown in Figure 8. The plunger has a cross bore 195 which interconnects channel 175 with channel 183 and a second cross bore 196 which connects channel 190 with channel 189. The sleeve 193 has an enlarged port 197 opposite the end of channel 183 and a second enlarged port 198 opposite channel 189 so that upon rotation of the handle 194 to the position indicated by the dotted line 199 the port 198 will be connected by the lateral channel 200 and channel 196 to port 201 which is an exhaust port, and line 183 will be connected through the cross bore 195 to channel 202 which is a pressure channel. The pressure channel 202 is a branch of the main supply line 86 and this valve serves as a manual means for controlling the movement of the connected slide and eliminates the use of additional adjusting mechanism. It will be noted that when the valve is turned in this manner that both lines 175 and 190 are completely closed so as not to disrupt the rest of the circuit. Movement of the handle to the position 199 will effect movement of the connected slide in one direction, while movement of the handle to the position indicated by the dotted line 203 will cause movement of the slide in an opposite direction. The port 201 may be connected to channel 204 and a fluid resistance 205 to the main return line 99. The fluid resistance serves to prevent abrupt movements of the slide and makes it possible to adjust the slide by minute amounts. Separate control valves 182 are provided for each of the slides and these valves may be mounted on the front of the machine, as shown in Figure 2, for manual control by the operator during set-up of the machine.

When utilizing the by-pass valves 182 to effect adjustment of the connected slide, the starting valve plunger 91 is moved to substantially a central position to build up sufficient pressure in the line 86 to effect the slide movement.

The reversing valve 184 is utilized for the purpose of changing the direction of the cutter slide relative to the tracer slide so that both slides may be caused to advance toward the master and work respectively for a given position of the tracer, or secondly that the cutter slide may be caused to move in an opposite direction relative to the work than the tracer moves relative to the pattern which makes it possible for instance to produce from a master in relief a work piece or die in intaglio.

The flow of fluid to cause advancing and retracting movements of the tracer and cutter slide is as follows: When the channel 142 is under pressure due to the position of the secondary valve, the check valve 164 will be closed causing the fluid to flow through the balancing valve 140 from port 143 to port 146, shifting the plunger 144 thereof toward the right. From port 146, the fluid will flow through channel 161 to port 162 and be divided by the ratio control valve 163 in suitable proportions between lines 170 and 171. These proportions will be maintained by the balancing valve 168 to which channels 170 and 171 are connected, the flow continuing from this valve through channels 174 and 175, the fluid in channel 174 passing through the reverse valve 184 to either channel 185 or 186 depending upon the position of the reverse valve and then through the by-pass valve 182 to either port 187 or 188 of the cutter slide cylinder 33. The fluid in channel 175 will flow through the by-pass valve 182 to the port 183 of the tracer slide cylinder 40.

The fluid in the left end of cylinder 40 will escape through port 189, by-pass valve 182, channel 190, to port 191 of balance valve 167. The fluid from the low pressure end of cylinder 33 will escape through the cylinder port at that end, through the by-pass valve 182 and the reverse valve 184 to the exhaust port 206. This port is connected by channel 207 to a second port 208 in the balance valve 167 from which it will be noticed that the return flow from both of these cylinders now passes through this same balancing valve. The plunger 209 of this valve will automatically take up a position as determined by the ratio control valve 160 which of course will be set in the same position as the plunger of the ratio control valve 163. The flow through port 208 will pass through the balance valve 167 to port 210 and thence through line 211, port 212, to port 159 of valve 160.

The flow from port 191 will pass through the balance valve 167 to port 213 and thence through line 214 and port 215 to port 154 of valve 160. It will now be seen that the return flow from both cylinders will combine as they escape through port 154 into line 158 and if plunger 152 of balance valve 149 is to the left will escape through the check valve 165 into line 150 and thereby return to reservoir.

If the secondary valve is set to cause retractive movement of both cylinders, the channel 150 will then be under pressure and the flow through this part of the system will be in a reverse direction, the return fluid from both cylinders combining at port 162 and escaping through channel 161 and check valve 164 to reservoir.

The proportionate feeding of the work and pattern slides is governed by the ratio control valve 157, which of course is set in the same ratio as the previous ratio control valves for a given work piece. This valve has a ratio control plunger 216 which divides the flow between channels 217 and 218 which channels are connected to a balancing valve 219 so that the fluid escaping from the balancing valve into channels 220 and 221 will be maintained in given proportions in this same manner as the previously described devices. The channels 220 and 221 are connected to ports 222 and 223 respectively of a reverse valve 224. This valve has a first pair of ports 225 and 226 which are connected through channels 227 and 228 to opposite ends of cylinder 21; and a second pair of ports 229 and 230 which are connected by channels 231 and 232 to ports 233 and 234 of an auxiliary reversing valve 235 which performs the same function as the reversing valve 184; that is, to change the direction of movement of the pattern slide with respect to the work supporting slide so that copies of opposite hand to the pattern may be produced.

Figure 7:
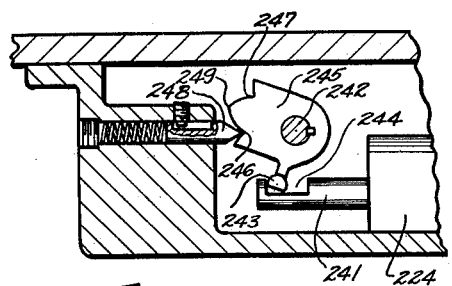
Figure 7 is a section on the line 7—7 of Figure 2.

The reversing valve 224 has a series of exhaust ports 236, 237, 238 and 239 which are connected to the common return line 240. Attention is invited to the fact that the pressure flow to cylinders 15 and 21 always comes through channel 155 and is directed in accordance with the position of the first valve 224 to cause reciprocating movement of the slides, with the result that the channel 240 is always a return channel. The reversing valve 224 may be manually or automatically controlled. To this end the plunger 241 has connected, as shown in Figure 7, an oscillatable shaft 242 which has a ball-ended lever 243 keyed thereto and engaging a slot 244 formed in the end of the plunger 241. This slot is sufficiently long to provide the necessary amount of lost motion to permit automatic completion of a valve movement. Integral with the arm 243 is a portion 245 having a pair of spaced indents 246 and 247 formed in the end thereof for cooperation with a spring pressed plunger 248. As the shaft 242 is rotated, the lost motion is taken up in slot 244 and the same time the plunger 248 rises to the peak 249 formed between the indents so that as it passes over the peak it will automatically complete the valve movement.

The shaft 242 extends vertically upward as shown in Figure 2 adjacent one side of the work table 13 and is provided with a laterally extending wing 250 for cooperation with suitably formed trip dogs 251 carried in T-slots 252 formed in the front face of the table. These dogs may be suitably positioned to control the length of reciprocating movement not only of the slide 13 but also of the slide 19.

Figure 6:
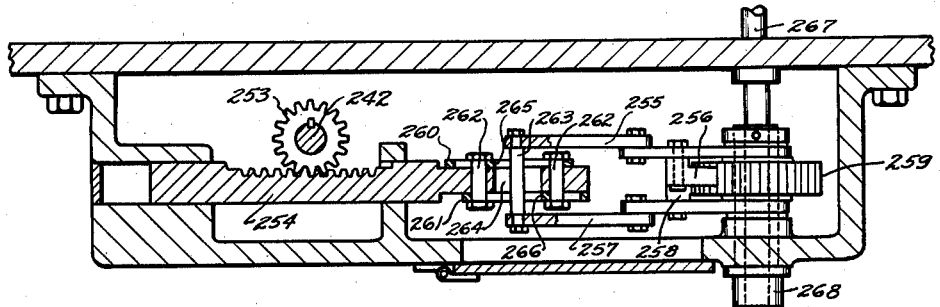
Figure 6 is a section on the line 6—6 of Figure 2.

At each end of the reciprocating movement it is desirable that the cutter and tracer be indexed either upwardly or downwardly so that cutting may be effected in both directions of movement. To this end the shaft 242 is provided with a pinion 253 as shown in Figure 6, which intermeshes with a rack bar 254. This rack bar is connected to a first pair of toggle arms 255, one of which supports a pawl 256 and to a second pair of toggle arms 257 which support a pawl 258. It will be noted from Figure 2 that one pair of toggle arms lie in a plane above the plane of the rack bar and the other pair lie in a plane below the rack bar. This means that when the rack bar is moved toward the right Figure 2, that the pawl 256 will engage the ratchet wheel 259 to cause rotation thereof while the other pawl will be retracting to a new position. Upon movement of the rack bar to the left, the pawl 258 will cause rotation of the ratchet wheel and the pawl 256 will be retracting to a new position. Thus, upon each reversal in the direction of movement of the work slide 13, the ratchet wheel 259 will be rotated a predetermined amount to cause indexing of the cutter and tracer slide through mechanism to be described presently.

The amount of the index movement is determined by a pair of plates 260 and 261 attached to opposite sides of the rack bar by bolts 262. These plates have longitudinal slots formed centrally thereof in which slides a pin 263 which is integrally connected to the ends of both toggle links. The rack bar itself also has a central longitudinal slot 264 which coincides with the slots in the side plates. When the plates are in the position shown in Figure 6, the movement of the rack bar is not sufficient to cause operation of the toggle links, but if the side plate 260 is adjusted toward the right by loosening bolts 262 and the side plate 261 adjusted toward the left, the shoulders 265 and 266 of these plates will gradually approach one another to cut down the amount of lost motion between the pin 263 and the plates to cause movement thereof. If only one plate is adjusted, the indexing movement effected upon one reversal of the table will be more than that effected at the other end of the table. Furthermore, either one of the pawls 256, 258 may be turned out of position so that indexing will only take place at one end of the table stroke.

The ratchet wheel 259 is keyed to one end of a shaft 267 which may be provided with a hand crank 268 for manual rotation thereof. The shaft 267 extends crosswise of the bed of the machine as shown in Figure 1, to a position adjacent the plane in which the elevating screws for the cutter and tracer slides lie.

As shown in Figure 4 the end of shaft 267 is provided with a bevel gear 269 which intermeshes with a bevel gear 270 keyed to the end of elevating screw 271 for the cutter slide. A second bevel gear 272 is integral with the bevel gear 270 and intermeshes with a bevel gear 273 keyed to the end of horizontal shaft 274. This shaft projects beyond the bed into the change gear box 275 for receiving any one of a plurality of change gears 276 which may be mounted on the end thereof. The change gear 276 intermeshes with change gear 277 detachably secured to the end of sleeve 278. The sleeve 278 is mounted for free rotation on shaft 279 and is provided with clutch teeth 280 on one end thereof, for inter-engagement with complementary clutch teeth 281 formed on a slidable clutch member 282. When these clutch teeth are interengaged, the gear 277 drives through the sleeve 278 and shaft 279 a bevel gear 283 which, through intermeshing with bevel gear 284, causes rotation of the tracer slide elevating screw 285. The clutch 282 is also shiftable to inter-engage teeth 286 formed on the opposite end thereof with teeth 287 formed on the hub of bevel gear 288. Bevel gear 288 inter-meshes with bevel gear 289 secured to the end of shaft 290 which, as shown in Figure 1, extends to the opposite side of the machine for manual operation through lever 291 so that the operator may stand in a position adjacent the tracer when manually adjusting the same.

The change gears 276 and 277 are provided so that these may be proportioned in the same proportion as the ratio control valve when producing work of different size than the pattern. The clutch 282 makes it possible to disconnect the tracer slide from the other mechanism so that it may be individually adjusted or the cutter slide may be individually adjusted by rotation of handle 268 when the clutch 282 has been moved to the right as viewed in Figure 4.

There has thus been provided an automatic pattern controlled machine tool which is capable of automatically producing enlargements, reductions, opposite hands of a pattern, or dies in intaglio from patterns in relief.

What is claimed is:

1. In a pattern controlled machine tool the combination of fluid operable means for causing relative movement between a tracer and a pattern in a first and a second direction, additional fluid operable means for causing relative movement between a cutter and a work piece in a first and in a second direction, and tracer controlled means for determining the ratio of the rate of the first directional movements relative to the respective second directional movements.

2. In a power operable pattern controlled machine tool, the combination with a power circuit for causing simultaneous approach of a tracer and a cutter relative to a pattern and a work piece respectively, of means in said circuit for causing said movements to take place at different rates of predetermined ratio, and tracer controlled means operatively connected for control of said power circuit to vary said rates while maintaining the ratio therebetween.

3. In a power operable pattern controlled machine tool, the combination of a power circuit operatively connected for movement of a pattern slide and a work slide, means in said circuit for proportioning the amount of power delivered to said slides in desired ratios, and means operable by the tracer for controlling operation of said circuits.

4. In a pattern controlled machine tool having a pattern slide and a work slide, the combination of individual fluid operable means for moving each slide, a circuit including a source of pressure and rate control means whereby upon coupling of said source to said circuit the slides will move at predetermined differential rates, and a tracer controlled mechanism for determining the rate at which said source will be supplied to said circuit.

5. In a pattern controlled machine tool having a tracer slide and a cutter slide, the combination of a power circuit for controlling advance and retraction of the slides relative to a pattern and a work piece respectively, means in said circuit for causing differential rates of slide movements in either direction upon application of power to the circuit, and means responsive to movement of the tracer for controlling the application of power to said circuit.

6. In a milling machine the combination with a cutter and a work support, of means affording relative movement between said supports in two angularly related paths, a tracer support, a pattern support, means affording relative movement between the tracer support and pattern support in two angularly related paths, power operable means for producing said relative movements in said paths, and means for positively controlling the movement in each path at predetermined differential rates.

7. In a machine tool, the combination of a bed, a first pair of fluid operable slides carried by the bed for movement relative thereto, a second pair of fluid operable slides carried by the bed, a source of fluid pressure, and fluid connections connecting said source to all of said slides for effecting simultaneous relative movements thereof but at differential rates.

8. In a pattern controlled machine tool, the combination of a bed, a first pair of fluid operable slides carried by the bed for supporting a cutter and a work piece for relative movement therebetween, a second pair of fluid operable slides carried by the bed for supporting a tracer and a pattern respectively for relative movement therebetween, individual fluid operable motors for the respective slides, a source of pressure, and fluid connections from said source to said motors including rate control means adjustable to cause one of said relative movements to take place at a different rate than the other to produce a work piece of unequal size relative to the pattern.

9. In an hydraulic control circuit, a first and second pair of fluid operable motors, said first pair of motors being connected for effecting relative movement between a tracer and a pattern, a second pair of motors connected for effecting relative movement between a cutter and a work table, a source of fluid pressure, a distributor valve for determining the flow among the several motors, and a tracer control circuit for determining the position of said distributor valve.

10. In a pattern controlled milling machine, the combination of relatively movable pattern and tracer slides, power operable means for advancing and retracting one of said slides relative to the other, a cutter slide and a work slide, power operable means for advancing and retracting one of said last named slides relative to the other, a control circuit for said power means including a tracer, and means in said circuit controlled by actuation of the tracer by the pattern to cause said first named power operable means to effect a slide advancing movement, and said second named power operable means a slide retracting movement.

11. In a pattern controlled milling machine, the combination of relatively movable pattern and tracer slides, power operable means for advancing and retracting one of said slides relative to the other, a cutter slide and a work slide, power operable means for advancing and retracting one of said last named slides relative to the other, a control circuit for said power means including a pattern controlled tracer, and means in said circuit operable by the tracer when under control of the pattern to cause relative retracting movement between the pattern slide and the tracer slide and a relative advancing movement between the cutter slide and the work slide.

12. In a pattern controlled milling machine, the combination of relatively movable pattern and tracer slides, power operable means for advancing and retracting one of said slides relative to the other, a cutter slide and a work slide, power operable means for advancing and retracting the cutter slide relative to the work slide, a control circuit for said power means including a tracer mechanism, and means in said circuit operable by the mechanism when under control of the pattern to cause a given directional actuation of the first named power operable means, and a reverse directional actuation of the second named power operable means, whereby the slides of one pair will approach one another and the slides of the other pair will separate.

13. In a pattern controlled machine tool the combination of a first pair of slides for supporting a pattern and a tracer respectively, a second pair of slides for supporting a cutter and a work piece respectively, fluid operable means for effecting relative movement between the first pair of slides, additional fluid operable means for effecting relative movement between the second pair of slides, and means connecting the tracer for simultaneously determining the direction of the resultant movement effected by each of said fluid operable means.

14. In a pattern controlled machine tool, the combination of a first pair of slides for supporting a pattern and a tracer respectively, a second pair of slides for supporting a cutter and a work piece respectively, fluid operable means for effecting relative movement between the first pair of slides, additional fluid operable means for effecting relative movement between the second pair of slides, a control circuit connecting the tracer for determining the direction of resultant movement effected by each of said fluid operable means, and means in said circuit for varying the ratio between the rates of said resultant movements.

15. In a pattern controlled machine tool, the combination of a first pair of slides for supporting a tracer and a pattern respectively, a second pair of slides for supporting a work piece and a cutter respectively, separate fluid operable means for effecting relative movements between the respective pairs of slides, a control circuit for said means including a source of pressure, a tracer controlled distributor valve for dividing the flow from said source among said fluid operable means, and ratio control devices connecting said distributor valve to said fluid operable means, said devices being adjustable to cause the relative movement between one pair of slides to take effect at a different rate than the relative movement between the other pair of slides whereby reproduction of the pattern may be effected at an enlarged or reduced scale.

16. In a pattern controlled machine tool having a cutter slide and a tracer slide, the combination of fluid operable motors for the respective slides, and means for delivering fluid to said motors including rate proportioning means whereby one motor may be caused to actuate its slide at a rate different from the rate of actuation of the other slide.

17. In a pattern controlled milling machine, the combination with a work support, a cutter support movable toward and from the work support, a pattern support, and a tracer slide movable toward and from the pattern support, of a first fluid operable motor for moving the cutter support toward and from the work support, a second fluid operable motor for moving the tracer slide toward and from the pattern support, a source of pressure including a channel for delivering fluid to the motors, and adjustable rate control means associated with said channel for dividing the flow from said source among the respective motors for actuation thereof at the same or different rates whereby reproductions of a pattern may be made at the same or different scale.

18. In a pattern controlled milling machine, the combination with a work support and a cutter support movable toward and from the work support, of a pattern support, a tracer slide movable toward and from the pattern support, a first fluid operable motor for moving the cutter support, a second fluid operable motor for moving the tracer slide, a source of pressure, a tracer controlled distributor valve for connecting the source to said motors for reversible actuation thereby, and adjustable throttle means between the valve and motors for determining the rates of movement effected by the respective motors.

19. In a pattern controlling machine tool, a first pair of motors for effecting relative movement between a tracer and pattern, a second pair of motors for effecting relative movement between a cutter and a work piece, motor control means operatively connecting the tracer for governing simultaneously the direction of both of said movements to cause reproduction of the pattern in the work, and means including rate ratio control devices adjustable to cause the rate of one of said relative movements to be in a predetermined proportion to the rate of the other movement whereby the pattern will be reproduced at said predetermined proportion.

20. In a pattern controlled machine tool the combination of means for effecting relative movement between a pattern and tracer and between a cutter and work piece along undulatory paths, adjustable control means for causing one of said movements to take place at a different rate than the other to effect scale reproduction of the pattern, and means to index the tracer relative to the pattern, and the cutter relative to the work in proportional amounts equal to their ratio of relative movements along said paths.

21. A milling machine having a bed, a column rising from the bed, a pair of supports mounted on the bed on opposite sides of the column for movement relative thereto, an additional pair of supports mounted on the column, means for vertically adjusting the last named supports relative to the first pair of supports including independent elevating screws, a common screw actuator, means connecting the actuator to said screws for simultaneous rotation thereof at different rates, and means to disconnect one of the screws from said actuator whereby they may both be adjusted independently at the same or different rates.

22. In a pattern controlled milling machine having a tracer slide, a cutter slide, a work slide and a pattern slide, the combination of an hydraulic control circuit for determined movement of the slides to cause reproduction of a pattern in a work piece including individual motors for the respective slides, a source of pressure, a distributor valve, means connecting the valve to said motors including a first channel for delivering fluid to the tracer and cutter slide motors to cause advance of the respective slides, a second channel for delivering fluid to cause retraction of the tracer and cutter slide, a third channel for delivering fluid to the pattern and work slide motors, means in each channel for proportioning the flow therein among the respective connected motors whereby all relative movements between the cutter and work will be in predetermined proportion to corresponding movements between the pattern and tracer whereby the pattern may be reproduced at any desired scale.

23. In a pattern controlled milling machine having a tracer slide, a cutter slide, a work slide and a pattern slide, the combination of an hydraulic control circuit for determining movement of the slides to cause reproduction of a pattern including individual motors for the respective slides, a source of pressure, a distributor valve, means connecting the valve to said motors including a first channel for delivering fluid to cause advance of the tracer slide and cutter slide, a second channel for delivering fluid to retract the tracer and cutter slide, a third channel for delivering fluid to the pattern and work slide motors, means in each channel for proportioning the flow therein among the respectively connected motors whereby all relative movements between the cutter and work will be in predetermined proportion to corresponding movements between the pattern and tracer whereby the pattern may be reproduced at any desired scale, each of said proportioning means comprising a ratio control valve having a manually operable adjusting element and a scale associated therewith graduated to indicate the scale reproduction of the pattern.

24. In a pattern controlled milling machine having a tracer slide, a cutter slide, a work slide and a pattern slide, the combination of an hydraulic control circuit for determining relative movement between the cutter and work slides to cause reproduction of the pattern, including individual motors for the respective slides, a source of pressure, a distributor valve, a pattern controlled tracer mechanism including a pilot circuit controlled by the tracer for determining the position of the distributor valve, means connecting said valve to the motors including a first and second channel for delivering fluid to the tracer and cutter slide motors for reverse operation thereof, a third channel for delivering fluid to the pattern and work slide motors, means in each channel for proportioning the volume of flow among the respectively connected motors whereby all relative movements between the cutter and work will be in predetermined proportion to corresponding movements between the pattern and tracer whereby the pattern may be reproduced at any desired scale.

25. In a pattern controlled milling machine having a tracer slide, a cutter slide, a work slide and a pattern slide, the combination of an hydraulic control circuit for determining movement of the slides to cause reproduction of the pattern including individual motors for the respective slides, a source of pressure, a distributor valve, means connecting the valve to said motors including a pair of channels for delivering fluid to the tracer and cutter slide motors to reciprocate the slides, a third channel for delivering fluid to the pattern and work slide motors, means in each channel for proportioning the volume of fluid delivered to the respective motors whereby all relative movements between the cutter and work will be at a rate in predetermined proportion to the rate of corresponding movements between the pattern and tracer whereby the pattern may be reproduced at any desired scale, and a throttle valve for controlling the flow from said source to the distributor valve to determine the rate of operation of the machine without disturbing the ratio of said relative rates of movement.

26. In a pattern controlled milling machine having a tracer slide, a cutter slide, a work slide and a pattern slide, the combination of an hydraulic control circuit for determining movement of the slides to cause reproduction of the pattern, including individual motors for the respective slides, a source of pressure, a distributor valve, means connecting the valve to said motors including a pair of channels for delivering fluid to the motors of the tracer slide and cutter slide to advance or retract the same, a third channel for delivering fluid to the pattern and work slide motors, means in each channel for proportioning the flow to the respectively connected motors whereby all relative movements between the cutter and work will be proportional to corresponding movements between the pattern and tracer whereby the pattern may be reproduced at any desired scale, and a reversing valve associated with the cutter slide motor whereby the cutter slide may be caused to move selectively in the same or opposite direction relative to the direction of movement of the tracer slide.

27. In a pattern controlled milling machine having a tracer slide, a cutter slide, a work slide and a pattern slide, the combination of an hydraulic control circuit for determining movement of the slides to cause reproduction of the pattern in the work including individual motors for the respective slides, a source of pressure, a distributor valve, means connecting the valve to said motors including channels for delivering fluid for reverse actuation of the tracer and cutter slide motors, a third channel for delivering fluid for reverse actuation of the pattern and work slide motors, means in each channel for proportioning the volume of flow to the respective motors whereby all relative movements between the cutter and work will be in predetermined proportion to corresponding movements between the pattern and tracer whereby the pattern may be reproduced at any desired scale, and a reversing valve associated with the third channel for causing the table to move selectively in the same or opposite direction relative to the direction of movement of the pattern slide.

28. In a pattern controlled milling machine having a tracer slide, a cutter slide, a work slide and a pattern slide, the combination of an hydraulic control circuit for determining movement of the slides to cause reproduction of the pattern in the work including individual motors for the respective slides, a source of pressure, a distributor valve, means connecting the valve to said motors including delivery channels for reverse actuation of the tracer and cutter slide motors, a third channel for delivering fluid to the pattern and work slide motors, means in each channel for proportioning the volume of flow to the respective motors whereby all relative movements between the cutter and work will be in predetermined proportion to corresponding movements between the pattern and tracer whereby the pattern may be reproduced at any desired scale, a reversing valve associated with the third channel for causing the table to move selectively in the same or opposite direction relative to the direction of movement of the pattern slide, and an additional reversing valve for simultaneously changing the direction of movement of both the pattern slide and the work slide.

29. In a pattern controlled milling machine having a tracer slide, a cutter slide, a work slide and a pattern slide, the combination of an hydraulic control circuit for determining movement of the slides to cause reproduction of the pattern including individual motors for the respective slides, a source of pressure, a distributor valve, means connecting the valve to said motors including a first channel for delivering fluid to the motors of the tracer slide and cutter slide to advance the same, a second channel for delivering fluid to the last named motors to retract the tracer and cutter slide, a third channel for delivering fluid to the pattern and work slide motors, means in each channel for proportioning the volume of flow among the respectively connected motors whereby all relative movements between the cutter and work will be in predetermined proportion to corresponding movements between the pattern and tracer whereby the pattern may be reproduced at any desired scale, a reversing valve associated with the third channel for causing the table to move selectively in the same or opposite direction relative to the direction of movement of the pattern slide, an additional reversing valve for simultaneously changing the direction of movement of both the pattern slide and the work slide, and a trip controlled mechanism for shifting the last named reversing valve.

30. In a pattern controlled milling machine having a tracer slide, a cutter slide, a work slide and a pattern slide, the combination of an hydraulic control circuit for determining movement of the slides to cause reproduction of the pattern in the work, including individual motors for the respective slides, a source of pressure, a distributor valve, means connecting the valve to said motors including a first channel for delivering fluid to the motors of the tracer slide and cutter slide to advance the same, a second channel for delivering fluid to the last named motors to retract the tracer and cutter slide, a third channel for delivering fluid to the pattern and work slide motors, means in each channel for proportioning the volume of flow among the respectively connected motors whereby all relative movements between the cutter and work will be in predetermined proportion to all corresponding movements between the pattern and tracer whereby the pattern may be reproduced at any desired scale, a first reversing valve associated with the first pair of channels for selectively causing the cutter slide and tracer slide to advance or retract simultaneously relative to the work slide and pattern slide respectively; or one to advance and the other to retract simultaneously with respect to the work and pattern slides respectively; and a second reversing valve associated with the third channel for selectively causing the work slide and pattern slide to move in the same direction relative to the cutter slide and tracer slide; or simultaneously in opposite directions with respect to their respective slides.

31. In a pattern controlled milling machine having a tracer slide, a cutter slide, a work slide and a pattern slide, the combination of an hydraulic control circuit for determining movement of the slides to cause reproduction of the pattern in the work including individual motors for the respective slides, a source of pressure, a distributor valve, means connecting the valve to said motors including a first channel for delivering fluid to the motors of the tracer slide and cutter slide to advance the same, a second channel for delivering fluid to the last named motors to retract the tracer and cutter slide, a third channel for delivering fluid to the pattern and work slide motors, means in each channel for proportioning the flow therein among the respectively connected motors whereby all relative movements between the cutter and work will be in predetermined proportion to all corresponding movements between the pattern and tracer whereby the pattern may be reproduced at any desired scale, a first reversing valve associated with the first pair of channels for selectively causing the cutter slide and tracer slide to advance and retract simultaneously relative to the work slide and pattern slide respectively; or one to advance and the other to retract simultaneously with respect to the work and pattern slides respectively; a second reversing valve associated with the third channel for selectively causing the work slide and pattern slide to move in the same direction relative to the cutter slide and tracer slide; or simultaneously in opposite directions with respect to their respective slides; a third reversing valve, and mechanism trip operable from the work slide for shifting said third reversing valve.

32. In a machine tool having a plurality of movable slides and individual fluid operable motors for shifting the same, the combination of a source of pressure, a distributor valve, a throttle valve for determining flow from said source to the distributor valve, said throttle valve having a position for by-passing the flow from said source to reservoir, a pair of channels connected to said distributor valve for delivering fluid to said motors, and means for controlling actuation of the motors independent of said distributor valve including individual control valves for each motor, said valves having pressure ports coupled to the source of pressure between said source and the throttle valve, and means to position the throttle valve in an intermediate position to create pressure at said pressure ports.

33. In a machine tool having a plurality of movable slides and individual fluid operable motors for shifting the same, the combination of a source of pressure, a distributor valve, a throttle valve for determining flow from said source to the distributor valve, said throttle valve having a position for by-passing the flow from said source to reservoir, a pair of channels for delivering fluid from the distributor valve to said motors, means for controlling actuation of the motors independent of said distributor valve including individual control valves for each motor, said valves having pressure ports coupled between the source of pressure and throttle valve, means to position the throttle valve in an intermediate position to create pressure at said pressure ports, said individual valves having means therein to disconnect the distributor valve during individual operation of the respective motor whereby one motor may be adjusted without disturbing the other motors.

34. In a machine tool having a plurality of movable slides and individual fluid operable motors for shifting the same, the combination of a pump, a distributor valve, a throttle valve for determining flow from said pump to the distributor valve, said throttle valve having a position for by-passing the flow from said pump to reservoir, a pair of channels connected to said distributor valve for delivering fluid to said motors, means for controlling actuation of the motors independent of said distributor valve including individual control valves for each motor, said valves having pressure ports coupled to the output of the pump, means to position the throttle valve in an intermediate position to create pressure at said pressure port, said individual valves having means therein to disconnect the distributor valve during individual operation of a motor whereby one motor may be operated independently of the other motors, and nested control levers mounted on the machine for controlling the various individual valves.

35. A machine tool having a first and second slide, individual motors for shifting said slides, each motor having a first and second port, a source of pressure, a distributor valve for alternately connecting the motor ports to said source or to exhaust, a first channel for delivering fluid to the first of said ports, a second channel coupled to the second of said ports, a ratio control valve in each channel for proportioning the flow therethrough among the respective ports for differential operation of said motors, a positioning control valve for each motor having a pressure port and a pair of ports connected to the motor ports, and means to disconnect the motor ports from the distributor valve and selectively connect them to said pressure port for individual motor actuation.

36. A pattern controlled milling machine comprising a bed, a column uprising from said bed, guideways formed on the bed on opposite sides of the column, a work slide and a pattern slide mounted in the respective guideways, additional guideways formed on opposite faces of the column, a cutter slide and a tracer slide mounted respectively on the guideways of the column, power operable means to feed the pattern slide and the work slide in opposite directions to produce work pieces of the same hand with the pattern, and means to change the relative directions of one of said slides relative to the other to produce work pieces of opposite hand to the pattern, and means to differentiate said rates of movement to effect enlargements or reductions of either hand of the pattern.

37. A pattern controlled milling machine comprising a bed, a column uprising from said bed, guideways formed on the bed on opposite sides of the column, a work slide and a pattern slide mounted in the respective guideways, additional guideways formed on opposite faces of the column, a cutter slide and a tracer slide mounted respectively on the guideways of the column, power operable means to feed the pattern slide and the work slide in opposite directions to produce work pieces of the same hand with the pattern, means to change the relative directions of one of said slides relative to the other to produce work pieces of opposite hand to the pattern, means to differentiate said rates of movement to effect enlargements or reductions of either hand of the pattern, and means to feed the tracer and cutter slides in the same direction to produce work in intaglio from patterns in relief of either the same or opposite hand, and on either an enlarged or reduced scale.

38. In a pattern controlled machine tool the combination of power operable means for causing relative movement between a tracer and a pattern in a first and a second direction, additional power operable means for effecting relative movement between a tool and a work piece in a first and in a second direction, a tracer controlled means for determining the ratio of the rate of the first directional movements relative to the respective second directional movements.

39. In a pattern controlled machine tool having a pattern supporting slide and a work supporting slide, the combination of individual power operable means for moving each slide, a circuit including a source of power and rate control means whereby upon coupling of said source of power to said circuit the slides will move at predetermined differential rates, and a tracer controlled mechanism for determining the rate at which said source will be supplied to said circuit.

40. In a machine tool of the class described the combination of a bed, a first pair of power operable slides carried by the bed for supporting a tool and a work piece for relative movement therebetween, a second pair of power operable slides carried by the bed for supporting a tracer and a pattern respectively for relative movement therebetween, individual power operable motors for the respective slides, a source for supplying power to said motors and connections from said source to said motors including rate control means adjustable to cause one of said relative movements to occur at a different rate than the other to produce a work piece of unequal size relative to the pattern.

41. In a machine tool of the class described the combination of a work support, a tool support movable toward and from the work support, a pattern support, a tracer supporting slide movable toward and from the pattern support, a first power operable means for moving the cutter support, a second power operable means for moving said slide, a source of power, a tracer control power distributing means for connecting said source to said power operable means for reversible actuation thereby, and adjustable rate control means between the power distributing means and the power operable means for determining the rates of movement of the cutter support and the tracer slide.

42. A pattern controlled machine tool having a work slide, a pattern slide, a tool slide and a tracer slide, power operable means to feed the pattern slide and the work slide in the same directions with respect to the tracer slide and the tool slide respectively to produce work pieces of the same hand with the pattern, means to change the relative directions of one of said slides relative to the other to produce work pieces of opposite hand to the pattern, means to differentiate said rates of movement to effect enlargements or reductions of either hand of the pattern, and means to feed the tracer and tool slides in opposite directions relative to their respective cooperating slides to produce work in intaglio from patterns in relief of either the same or opposite hand and on either an enlarged or reduced scale.

43. In a machine tool, the combination of a bed, a first pair of fluid operable slides carried by the bed for movement relative thereto, a second pair of fluid operable slides carried by the bed, a source of fluid pressure and fluid connections connecting said source to all of said slides for effecting simultaneous relative movement between each pair of slides and at equal rates.

44. In a pattern controlled machine tool, the combination of a bed, a first pair of fluid operable slides carried by the bed for supporting a cutter and a work piece for relative movement, a second pair of fluid operable slides carried by the bed for supporting a tracer and a pattern for relative movement, a source of pressure and fluid connections from said source to said slides, including means to maintain the rate of relative movement between one pair of slides equal to the rate of relative movement between the other pair of slides.

45. A milling machine having a bed, a column rising from the bed, parallel guide ways formed on the bed on opposite sides of the column, a movable support mounted on each of said guide ways, an additional pair of supports mounted on the column, means for vertically adjusting the last-named supports relative to the first pair of supports including a common actuator, and means to move said first pair of supports simultaneously in the same or opposite directions.

46. A pattern controlled milling machine comprising a bed, a column uprising from said bed, guide ways formed on the bed on opposite sides of the column, a work slide and a pattern slide mounted in the respective guide ways, a cutter slide and a tracer slide supported by the column, and power operable means to feed the pattern slide and the work slide in opposite directions to produce work pieces of the same hand with the pattern.

47. A pattern controlled milling machine comprising a bed, a column uprising from said bed, guide ways formed on the bed on opposite sides of the column, a work slide and a pattern slide mounted in the respective guide ways, a cutter slide and a tracer slide supported by the column, power operable means to feed the pattern slide and the work slide in opposite directions to produce work pieces of the same hand with the pattern, and means to change the relative directions of one of said slides relative to the other to produce work pieces of opposite hand to the pattern.

48. In a machine tool of the class described, the combination of a bed, a first pair of power operable slides carried by the bed for supporting a tool and a work piece for relative movement therebetween, a second pair of power operable slides carried by the bed for supporting a tracer and a pattern for relative movement therebetween, power operable motors for moving the various slides, a source for supplying power to said motors, connections from said source to said motors including direction control means adjustable to cause one of said relative movements to have a direction opposite to the other.

49. In an automatic pattern controlled machine tool, the combination of separate supports for a pattern and a work piece, a cutter supported in operative relation to the work support, a tracer supported for deflection by a pattern on the pattern support, and power operable means responsive to deflection of the tracer for causing differential follow-up relative movement between the tracer and pattern and between the cutter and work.

50. A pattern controlled milling machine having a pair of spaced slides, a cutter and a tracer supported intermediate said slides for engagement with a work piece and a pattern carried by the respective slides, means controlled by the tracer for governing relative movement between the cutter and work and between the tracer and pattern, and means to differentiate the rate of said relative movements whereby the work may be formed in different scaled relation to the pattern.

LEIGH W. WRIGHT.